(12) United States Patent
Sonnenburg

(10) Patent No.: US 7,191,637 B2
(45) Date of Patent: Mar. 20, 2007

(54) METHOD FOR TESTING VIBRATION DAMPERS IN MOTOR VEHICLE

(75) Inventor: Reinhard Sonnenburg, Münnerstadt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 38 days.

(21) Appl. No.: 11/103,920

(22) Filed: Apr. 12, 2005

(65) Prior Publication Data

US 2005/0241366 A1  Nov. 3, 2005

(30) Foreign Application Priority Data

Apr. 29, 2004  (DE) ...................... 10 2004 021 131

(51) Int. Cl.
*G01M 17/04* (2006.01)
(52) U.S. Cl. .................... 73/11.04; 73/11.07; 73/11.08; 73/11.09
(58) Field of Classification Search ............... 73/11.04, 73/11.07, 11.08, 11.09
See application file for complete search history.

(56) References Cited

U.S. PATENT DOCUMENTS

| | | | | |
|---|---|---|---|---|
| 4,103,532 A | * | 8/1978 | Buzzi | ......................... 73/11.08 |
| 5,056,024 A | | 10/1991 | Stuyts | |
| 5,369,974 A | | 12/1994 | Tsymberov | |
| 5,648,902 A | * | 7/1997 | Honda | ......................... 701/29 |
| 5,665,901 A | | 9/1997 | Ilzig et al. | |
| 5,767,382 A | * | 6/1998 | Buchanan | ................... 73/11.08 |
| 6,360,580 B1 | | 3/2002 | Müller | |
| 6,531,958 B2 | | 3/2003 | Kabatek et al. | |
| 2004/0148074 A1 | | 7/2004 | Hessmert et al. | |

FOREIGN PATENT DOCUMENTS

| | | |
|---|---|---|
| DE | 27 23 527 | 12/1977 |
| DE | 29 05 931 | 8/1980 |
| DE | 41 20 169 | 3/1992 |
| DE | 44 40 413 | 5/1996 |
| DE | 198 23 369 | 12/1999 |

(Continued)

OTHER PUBLICATIONS

Hunter Engineering Co. Product Literature—Form No. 42701, uUnderstanding Suspension Results', (15 pages), dated: Jan. 1998.*

(Continued)

*Primary Examiner*—Edward Lefkowitz
*Assistant Examiner*—Freddie Kirkland, III
(74) *Attorney, Agent, or Firm*—Cohen Pontani Lieberman & Pavane LLP

(57) ABSTRACT

A method of testing a vibration damper mounted between a body and a wheel in a motor vehicle includes the steps of storing a parameter which corresponds to the damping force of a new vibration damper in a memory unit, wherein the parameter is the cushioning work of a tire relative to a defined excitation of a new vibration damper; subjecting the wheel to reciprocating excitation which causes the vibration damper to generate a damping force; determining the cushioning work of the tire based on the damping force during the reciprocating excitation; comparing the cushioning work of the tire during the reciprocating excitation with the parameter stored in the memory unit; and determining that the damper is defective when the cushioning work during the reciprocating excitation differs from the stored parameter by more than a predetermined amount.

9 Claims, 2 Drawing Sheets

FOREIGN PATENT DOCUMENTS

DE 100 17 558 10/2001
DE 101 22 405 7/2002

OTHER PUBLICATIONS

Hunter Engineering Co. Product Literature—Form No. 3923T, 368414 Brake Plates and SA400 Suspension Analyzer Sewice Manual (56 pages), dated: Oct. 1999.*

Hunter Engineering Co. Product Literature—Form No. 3921T, uInstallation and Assembly Guide For System B400 Plate Brake Tester and SA400 Suspension Ana/yze/"(29 pages), dated: Oct. 1999.*

Hunter Engineering Co. Product Literature—Form No. 39221, ç$WinSI Software—Operation Manual Version 3.f (select pages, including cover, index, 9-17, 29-36, and 89-96), dated: Jan. 2002.*

Hunter Engineering Company Product Literature, "Hunter Highlights", vol. 34/1998, Form No. 2880T-34, dated Jun. 1998.

European Search Report dated Jul. 14, 2005 issued for European Patent Application No. 05 00 8445.

* cited by examiner

METHOD FOR TESTING VIBRATION DAMPERS IN MOTOR VEHICLE

BACKGROUND OF THE INVENTION

1. Field of the Invention

The invention pertains to a method for testing vibration dampers in motor vehicles wherein a parameter which corresponds to the damping force of a vibration damper is stored in a memory unit, and a vibration damper and wheel are subjected to a reciprocating excitation which is used to generate a parameter which is compared to the stored parameter to ascertain the condition of the vibration damper.

2. Description of the Related Art

A vibration damper is one of the parts of a motor vehicle which is subject to wear. It must be remembered that a defective vibration damper has a significant effect on the driving safety of the vehicle. The driver himself cannot verify the functionality of a vibration damper, because the damping behavior deteriorates gradually, and the driver becomes accustomed to it.

Certainly the best way to test the functionality of a vibration damper is to remove the vibration damper from the vehicle and to subject it to a testing program in a special test machine. This approach is described in DE 41 20 169 A1. When a spring strut unit is involved, however, with a suspension spring surrounding the vibration damper, it can be quite expensive to remove the vibration damper from the vehicle.

For this reason there have been numerous attempts to test a vibration damper for its functionality while it is still installed in the vehicle. The basic principle is to use a testing device with a drive unit which causes a wheel support plate to oscillate. A possible defect in the installed vibration damper can be detected by comparing its decay curve with that of a new vibration damper. U.S. Pat. No. 5,665,901, for example, describes a test bench of this type.

An essential problem, however, is that not only the vibration damper but also the axle joints and the vehicle tires play a part in the testing of the vibration damper. The influence of the vehicle tires can be minimized through the use of an elastic member in the test bench. This situation is presented in U.S. Pat. No. 6,531,958.

SUMMARY OF THE INVENTION

The task of the present invention is to provide a method for testing vibration dampers installed in motor vehicles in such a way that reliable test results are obtained.

According to the invention, the cushioning work of the tire relative to a defined excitation acting in conjunction with a new vibration damper is stored as a parameter in a memory unit. The cushioning work of the tire is then detected during the test of the vibration damper. It is assumed that the vibration damper is defective when the deviation between the measured cushioning work and the value of the cushioning work of the tire stored in memory exceeds a certain value.

Experiments have shown that the damping work of a vibration damper stands in a defined relationship to the cushioning work of the tire. If the cushioning work of the tire in a vehicle acting in conjunction with a new vibration damper is known, then the damping work of a used vibration damper can also be determined. The extent of the deviation between the cushioning work of the tire for a new vibration damper and that for a used damper is a clear indication of how worn the damper is.

It is also provided that the cushioning work of the tire is determined from the movement of the wheel mass relative to the wheel support surface, from the movement of the vehicle body, and from the proportionate mass of the vehicle body.

In a further advantageous embodiment of the method, a sensor system installed in the vehicle is used to detect the parameter for determining the cushioning work of the tire. For example, it is possible to use a signal for the acceleration of the body in conjunction with a defined proportionate mass of the vehicle body to calculate the tire force acting on the tire. If the vehicle is equipped with appropriate sensors, i.e., at least with an accelerometer on the body, it is also possible to use the surface of the road as the wheel support surface. Thus it is possible to test the functionality of the vibration damper at intervals or continuously while the vehicle is being driven.

The relative travel of the unsprung mass of the wheel and the vehicle axle with respect to the wheel support surface is determined by integral calculus using an acceleration signal for the wheel. An accelerometer can be mounted relatively easily on the wheel and can also be used for any chassis control processes, for example, for which provisions may have been made.

In a further advantageous embodiment of the method, the cushioning work of the tire is determined from the integral of the product of the tire force times the relative travel of the wheel over time.

A vibration damper is of especially good quality with respect to its damping force when the tire performs only minimal cushioning work relative to the external excitation of the wheel. This property offers the advantage that the cushioning work of the tire must be tested and evaluated only insofar as necessary to determine the extent to which it has increased.

This also leads to the possibility that the functional relationship between tire spring rate and tire pressure can be stored in another memory unit and used to monitor the tire pressure. The spring rate of the tire is determined from the tire force and the relative movement of the wheel with respect to the wheel support surface, and then the instantaneous tire pressure is determined from the calculated spring rate. In an inventive system, therefore, it is not necessary to measure the tire pressure directly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
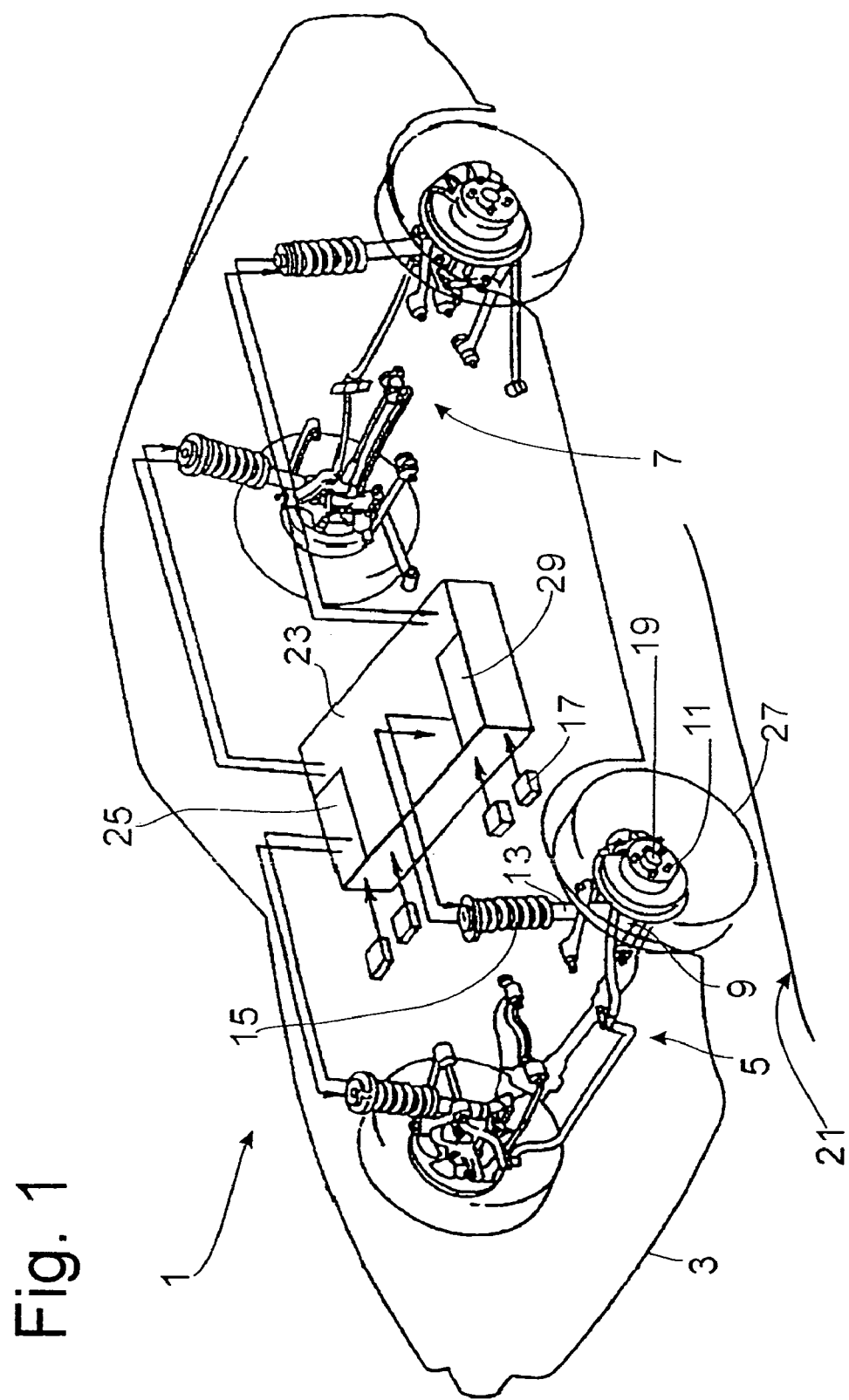
FIG. 1 shows a schematic diagram of the assemblies used in the method.

FIG. 1 shows an outline of a motor vehicle, the body 3 of which is carried by a front axle 5 and a rear axle 7. The two axles have control arms 9 with wheel carriers 11 supported on the body. Vibration dampers 13 and vehicle suspension springs 15 are installed between the axles and the body. At least one sensor 17 is attached to the body to provide a vertical acceleration signal for the body. An accelerometer 19, furthermore, is mounted on a control arm or on the wheel carrier. This accelerometer converts the relative movement of the control arm 9 or of the wheel carrier 11 with respect to the wheel support surface 21 into a wheel acceleration signal. The signal lines of the sensors are connected to a computer unit 23. The computer unit comprises a first memory 25, which stores a value for the cushioning work of at least one tire 27 of a wheel on one of the axles relative to a defined excitation acting in conjunction with a new vibration damper.

Figure 2:
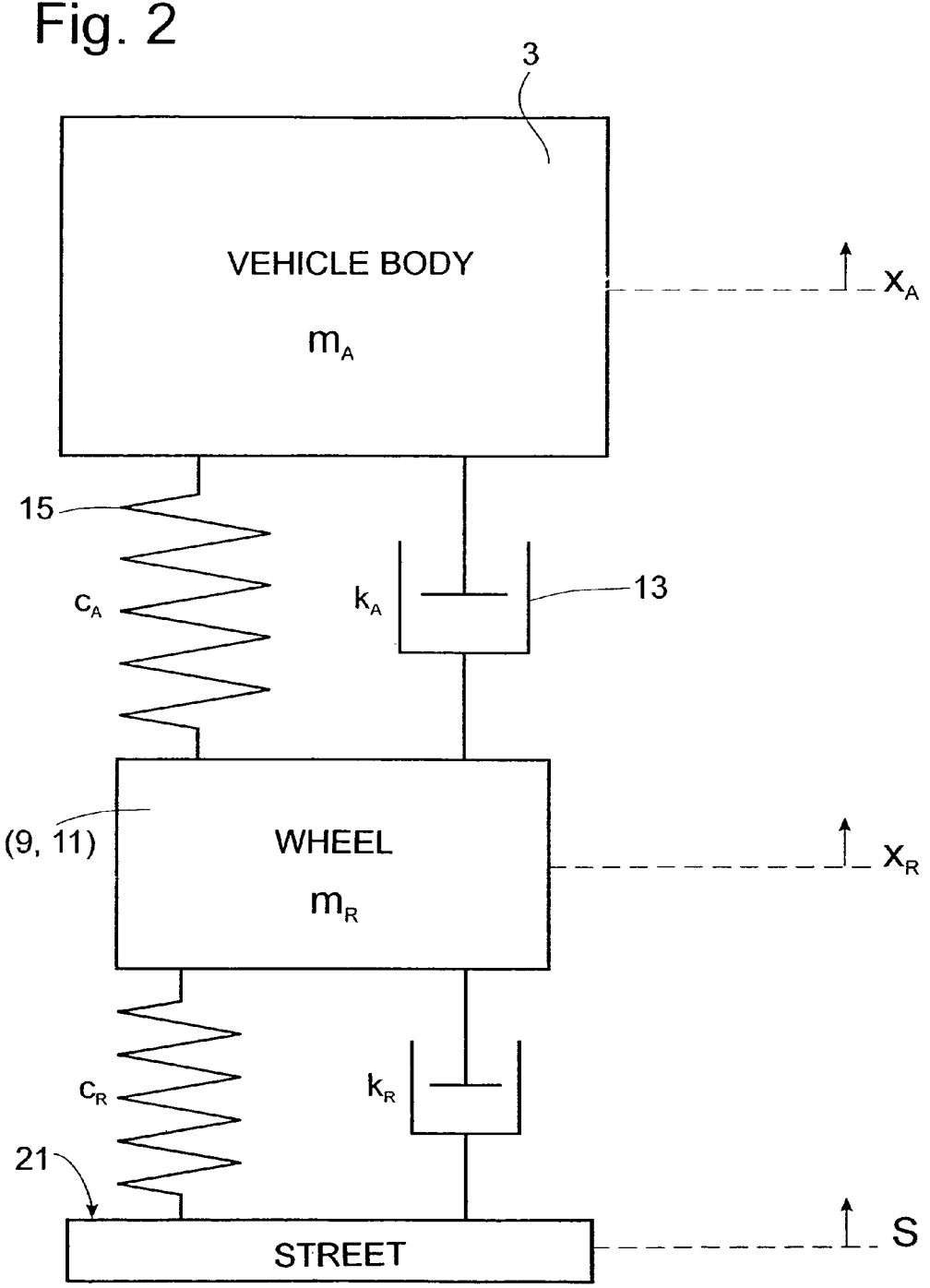
FIG. 2 shows a diagram that is the mathematical equivalent of FIG. 1.

FIG. 2 shows an equivalent diagram of the vehicle according to FIG. 1. The vehicle body 3, assumed by way of simplification to consist of four quarters, one per axle half, can oscillate vertically with respect to the wheel, the tire 27 of which is elastic within certain limits and which is therefore shown as a spring with the spring rate $c_R$ and a damping function $k_R$. The spring rate of the vehicle suspension spring 15 is $c_A$, and the damping function of the vibration damper is $k_A$. Thus the vehicle body and the wheel cooperate to form a dual-mass oscillator.

From the sum of the mass $m_A$ of the body multiplied by the body's vertical acceleration and the mass of the wheel and unsprung axle multiplied by the wheel's vertical acceleration, it is possible to calculate the tire force acting on the tire 27. The movement of the wheel mass, especially the elastic travel of the wheel hub relative to the road, multiplied by the force acting on the tire represents the instantaneous cushioning work of the tire. The elastic travel of the wheel hub relative to the road surface is determined by integral calculus using the wheel acceleration signal relative to the road surface. From the integral of the product of the tire force times the relative travel of the wheel hub relative to the road surface over time, the cushioning work of the tire over a wider time spectrum is determined. This cushioning work is compared with a value stored in the memory 25, e.g. the cushioning work of the tire with a new vibration damper, which is assigned to a specific excitation by the road surface. It can be assumed that the vibration damper is defective if the calculated cushioning work of the tire deviates by more than a certain amount from the stored value for the cushioning work. It has been found that, with respect to its damping force characteristic, a vibration damper allows especially good chassis properties to become effective when the tire performs only minimal cushioning work relative to external excitation. This property simplifies the testing of the vibration damper, because it means that the cushioning work of the tire cannot become smaller during the course of the operating life of the vibration damper.

The spring constant of the tire depends on the way the tire is built and on the pressure inside it. The functional relationship between the tire spring rate $c_R$ and tire pressure is stored in another memory 29, so that the tire pressure can be monitored. The spring rate of the tire is determined from the tire force and the relative movement of the tire with respect to the wheel support surface 21, and the instantaneous tire pressure is then determined from the calculated spring rate.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method of testing a vibration damper mounted between a body and a wheel in a motor vehicle, the wheel being mounted on an axle and carrying a tire, the method comprising:

storing a parameter which is related to the damping force of a new vibration damper in a memory unit, wherein the parameter is the cushioning work of a tire relative to a defined excitation of a new vibration damper;

subjecting, by a support surface, the wheel to reciprocating excitation which causes the vibration damper to generate a damping force;

determining a tire force acting on the tire during the reciprocating excitation;

determining an elastic vertical travel of the wheel relative to the support surface during the reciprocating excitation;

determining the cushioning work of the tire during the reciprocating excitation based on the tire force and the elastic vertical travel of the wheel relative to the support surface;

comparing the cushioning work of the tire during the reciprocating excitation with the parameter stored in the memory unit; and determining that the damper is defective when the cushioning work during the reciprocating excitation differs from the stored parameter by more than a predetermined amount.

2. The method of claim 1 further comprising the steps of:

determining a vertical acceleration of the wheel relative to the support surface, wherein the step of determining the elastic vertical travel of the wheel relative to the support surface is based on the vertical acceleration of the wheel relative to the support surface; and determining a vertical acceleration of the vehicle body; and wherein the step of determining the tire force is based on the vertical acceleration of the wheel relative to the support surface, the vertical acceleration of the vehicle body, and a proportional mass of the vehicle body.

3. The method of claim 2 wherein the method is performed using a sensor system installed in the vehicle.

4. The method of claim 3 wherein the sensor system comprises an acceleration sensor for determining the elastic vertical acceleration of the wheel relative to the support surface, wherein the elastic vertical travel of the wheel relative to the support surface is determined by integral calculus using the vertical acceleration of the wheel relative to the support surface.

5. The method of claim 4 wherein the sensor system comprises an acceleration sensor for determining the vertical acceleration of the vehicle body.

6. The method of claim 5 wherein the cushioning work of the tire is determined by integrating the product of the tire force and the elastic vertical travel of the wheel relative to the support surface over time.

7. The method of claim 5 further comprising:
storing a functional relationship between a tire spring rate and a tire pressure in a memory;
determining the tire spring rate using the tire force acting on the tire and the elastic vertical travel of the wheel relative to the support surface; and
determining the tire pressure based on the determined tire spring rate and the functional relationship.

8. The method of claim 1 wherein the support surface is a road.

9. The method of claim 1 wherein the damping force of the vibration damper is inversely proportional to the cushioning work performed by the tire.

* * * * *